(12) United States Patent
Woodard et al.

(10) Patent No.: US 8,738,623 B2
(45) Date of Patent: May 27, 2014

(54) GLOBAL REVERSE LOOKUP PUBLIC OPINION DIRECTORY

(76) Inventors: Benjamin Henry Woodard, Thousand Oaks, CA (US); Eric Brennan Rodrick, Newbury Park, CA (US)

(*) Notice: Subject to any disclaimer, the term of this patent is extended or adjusted under 35 U.S.C. 154(b) by 278 days.

(21) Appl. No.: 13/113,031

(22) Filed: May 21, 2011

(65) Prior Publication Data

US 2011/0289078 A1    Nov. 24, 2011

Related U.S. Application Data

(60) Provisional application No. 61/347,194, filed on May 21, 2010.

(51) Int. Cl.
*G06F 17/30* (2006.01)

(52) U.S. Cl.
USPC .................................. 707/737; 707/999.004

(58) Field of Classification Search
USPC ......... 707/707, 709, 723, 734, 737, 767, 804, 707/999.004; 705/26.1
See application file for complete search history.

(56) References Cited

U.S. PATENT DOCUMENTS

| | | | |
|---|---|---|---|
| 7,922,090 B2 * | 4/2011 | Roselli | 235/487 |
| 8,275,648 B2 * | 9/2012 | Carrier et al. | 705/7.32 |
| 8,527,357 B1 * | 9/2013 | Ganesan | 705/26.1 |
| 2009/0306967 A1 * | 12/2009 | Nicolov et al. | 704/9 |

* cited by examiner

*Primary Examiner* — Marc Filipczyk

(57) ABSTRACT

Embodiments of the present invention address deficiencies of the art in respect to Internet resource metadata creation and utility and provide a method, system and computer program product for the transformation of articles creating subjective metadata utilized for discovery into articles creating mathematical data that is inherently dynamic, global, composed of auditable elements, conducive to relational cross-reference, and utilized to produce statistical opinion data.

13 Claims, 15 Drawing Sheets

| | A | B | C | D | E | F | G |
|---|---|---|---|---|---|---|---|
| 1 | ID NUMBER: 1001 | | URL: http://www.example.com/article_1 meta title: "Air Jordan Returns" | example.com meta desc "?" | .com "?" | /article_1 meta key 2 "?" | Freq: 498 meta key 3 "?" |
| 2 | Respondent IP: 255.255.xxxx | | | | meta key 1 | | |
| 3 | Member? Y/N | 1 | PST: 22:01:10.002 | USA | 21 | IEv7 | 62 seconds |
| 4 | Judge creator? | 0 | Member ID: 123XYZ | Male | 227 | 1024X768 | google.com |
| 5 | Judge content? | 1 | | Survey 1 | 1 | Harm | Help |
| 6 | CATEGORY | | | | | 0.00 | 5.20 |
| 7 | PEOPLE | 1 | | Survey 2 | 1 | Bias | Fairness |
| 8 | sports | 1 | | | | 0.00 | 7.93 |
| 9 | user keyword: | 1 | Michael, Jordan | | | Intolerance | Tolerance |
| 10 | EVENTS | 0 | | | | 0.00 | 6.77 |
| 11 | SOCIETY | 0 | | | | Ignorance | Education |
| 12 | Type | | | | | 0.00 | 2.30 |
| 13 | ARTICLE | 0 | | Survey 3 | 1 | Hate | Love |
| 14 | BLOG | 1 | | | | 0.00 | 2.10 |
| 15 | OBJECT | 0 | | | | Greed | Giving |
| 16 | Additional User Keywords: | 1 | best, player | | | 9.50 | 8.00 |
| 17 | User comment string: | 0 | | | | Fear | Faith |
| 18 | | | | | | 0.00 | 6.00 |
| 19 | | | | Survey 4 | 0 | | |
| 20 | | | | Survey 5 | 0 | | |
| 21 | | | | Survey n | 0 | | |

FIG. 4

|   | A | B | C | D | E | F | G | H | I | J | K | L | M |
|---|---|---|---|---|---|---|---|---|---|---|---|---|---|
| 1 | A1 | C3 | A2 | C1 | D1 | E1 | F1 | G1 | C2 | D2 | E2 | F2 | G2 |
| 2 | 1001 | .. | .. | .. | .. | .. | .. | .. | .. | .. | .. | .. | .. |
| 3 | 1002 | | | | | | | | | | | | |
| 4 | 1003 | | | | | | | | | | | | |
| 5 | ... | | | | | | | | | | | | |

FIG. 5A

|   | A | N | O | P | Q | R | S |
|---|---|---|---|---|---|---|---|
| 1 | A1 | B3 | C4 | D3 | E3 | D4 | E4 |
| 2 | 1001 | 1 | | 123XYZ | USA | 21 MALE | 227 |
| 3 | 1002 | | | | | | |
| 4 | 1003 | | | | | | |
| 5 | ... | | | | | | |

FIG. 5B

|   | A | T | U | V | W | X | Y | Z | AA | AB | AC | AD | AE | AF | AG | AH | AI | AJ | AK | AL | AM | AN |
|---|---|---|---|---|---|---|---|---|----|----|----|----|----|----|----|----|----|----|----|----|----|----|
| 1 | A1 | F3 | G3 | F4 | G4 | B4 | B5 | B7 | B8 | B9 | B10 | .. | E5 | .. | G6 | E7 | .. | G8 | .. | B16 | C16 | C16 |
| 2 | 1001 | Ev7 | 62 | 102.. | go.. | 0 | 1 | 1 | 1 | 1 | 0 | .. | 1 | | 5.20 | 1 | | 7.93 | | 1 | best | player |
| 3 | 1002 | | | | | | | | | | | | | | | | | | | | | |
| 4 | 1003 | | | | | | | | | | | | | | | | | | | | | |
| 5 | ... | | | | | | | | | | | | | | | | | | | | | |

GLOBAL REVERSE LOOKUP PUBLIC OPINION DIRECTORY

CROSS-REFERENCE TO RELATED APPLICATIONS

This application is a non-provisional of, and claims priority to, U.S. Provisional Application Ser. No. 61/347,194 filed May 21, 2010, the contents of which are incorporated herein by reference in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The field of the present invention relates generally to data collection and processing and more particularly to the field of Internet resource bookmarking and metadata creation. The invention's utility within the field of public opinion polling is a direct result of transformative effects upon the articles producing bookmarks and web page metadata, therefore the background discussed herein will focus on the history of bookmarking technology.

As the volume of global Internet data and web resources grew exponentially from inception, systems and methods such as search engines and search algorithms were developed that transformed machines that could access and render the Internet, such as computing devices and browsers, into machines that could utilize the Internet by filtering millions of possible resources into small, meaningful, and useful groups of resources. The subsequent development of a "favorites" functionality within browsers marked another generation of transformative technology as machines capable of utilizing the Internet were now able to easily save and instantly re-access the small groups of resources made available through the filtering technology of search engines and algorithms. This new technology is known in the art as the "bookmarking" of resources and is characterized in modern web browsers with simple graphic functions that allow users to save, name, organize, and recall specific Internet uniform resource locators (URLs) from local memory by employing the Internet and common HTTP and HTML naming and rendering schemes.

As bookmarking became ubiquitous, new transformations improved upon prior art, namely web-based bookmarking and social bookmarking websites. Web-based bookmarking allows users to place their bookmarks on a remote server, typically utilizing a registration, username, and password system to provide for global access and manipulation of a user's personal bookmarks from any computing, mobile, or other device with access to the Internet. Social bookmarking websites provide for and sustain online environments wherein groups of web-based bookmarking users can share and utilize each other's bookmarks.

In response to the vast commercial profit and social networking potential created by publicly sharing large numbers of private web-based bookmarks, the Internet has seen the rapid growth of social bookmarking websites in recent years. These websites typically: allow free membership via a registration process, require username and password access, provide for customizable member profile pages, and provide the opportunity to download a graphical user interface (GUI) site access program. This program is typically downloaded into a user's web browser, referred to in the art as downloading a "toolbar" or "plug in" and greatly facilitates bookmark creation and management.

Social bookmarking websites have experienced rapid growth primarily by allowing the assignment of subjective keywords by users to describe and classify their public bookmarks, known in the art as "tagging". Without the tagging system, a social bookmark site would simply consist of an enormous database of random URLs that would be difficult to browse or utilize for any effective purpose. By utilizing tagging, these websites can allow members to search and extract publicly stored bookmarks using keywords of interest to them; members can also create effective social networks by using inference and judgment to assess the personality of other members by inspecting another member's choice of bookmarks, tag usage and profile page. Specific examples of social bookmarking websites successfully using the tagging system include delicious.com and stumbleupon.com; many of those skilled in the arts believe a major transformation is possibly underway wherein the search algorithm methodologies, which have transformed the utility of the Internet in dramatic fashion, could soon be eclipsed by the metadata methodologies exemplified by social bookmarks.

Tagging systems produce new data (subjectively assigned keywords, votes in favor or against, etc.), or "metadata", about existing data (web resources) and collectively comes to be known in the art as a "folksonomy". Metadata and resultant folksonomy are key drivers in the continued growth of social bookmarking sites: as their members continue to exploit the entertainment, networking, discovery, and text query search facility of this metadata, the sites themselves reap economic benefits from the increase in Internet traffic and rankings derived from their growing base of members and the vast quantities of links to and from their sites. The elemental data used to create current metadata is based on the subjective and creative process of users attaching individually chosen keywords to their bookmarks. For example, 100 users bookmarking a particular web page containing a news article about Wall Street may literally assign 100 or more different keywords to the same article.

Current processes enabling creation and usage of metadata are rich with benefits, opportunities, and challenges. Many of these were discussed in detail at The 16th International World Wide Web Conference in Alberta, Canada in 2007, and subsequently published in an article titled *The Complex Dynamics of Collaborative Tagging*. The current invention addresses deficiencies of the art within current metadata construction and provides systems and methods for the transformation of articles employed in said construction.

BRIEF SUMMARY OF THE INVENTION

Embodiments of the current invention provide a novel and non-obvious system, method and computer program product to create objective web page metadata suitable for use as statistically viable input into politically and commercially relevant public opinion measurement and repository systems.

One embodiment of the enclosed system addresses the described, and other, deficiencies in prior art utilizing a structured format to strategically gather at least one scaled, mathematically valued, controlled-vocabulary opinion regarding the content of a web resource from all users requesting to comment upon or bookmark said resource while and employing at least two data integrity steps before storage of said opinion.

Embodiments of the disclosed invention provide for additional classification of resources and metadata among fixed categories and types. Subjective keywords, unstructured vocabulary commenting, and other customary user attributions to resources may be collected only after a predetermined number of controlled vocabulary, scaled opinions have been recorded.

Embodiments of the current invention objectify subjective values, judgments, opinions and beliefs and convert cognitive responses into numeric relational database inputs. The inherent nature of said database output is geographically broad, demographically cross-sectional, ongoing, dynamic, and provides for transformation of current articles of social bookmarking and web page commenting into articles of public opinion measurement.

Embodiments of the current invention utilize cross-referencing membership data to create useful social networking, marketing, and advertising opportunities and systems.

Embodiments of the current invention transform articles of prior art from keyword-based discovery and social networking mechanisms into number-based measurement and polling mechanisms providing database output characterized by statistical integrity, auditable core data elements, and complex cross-reference conducivity.

It is to be understood that both the foregoing general description and the following detailed description of a preferred embodiment of the current invention are exemplary and explanatory only and are not restrictive of the invention, as claimed.

BRIEF DESCRIPTION OF THE SEVERAL VIEWS OF THE DRAWING

FIG. 4 is a sample Response Master File.

FIG. 5A is a representation of Data Set 500.

FIG. 5B is a representation of Data Set 505.

FIG. 5C is a representation of Data Set 510.

FIG. 7 is a sample of Survey Form 1B.

DETAILED DESCRIPTION OF THE INVENTION

Figure 1:
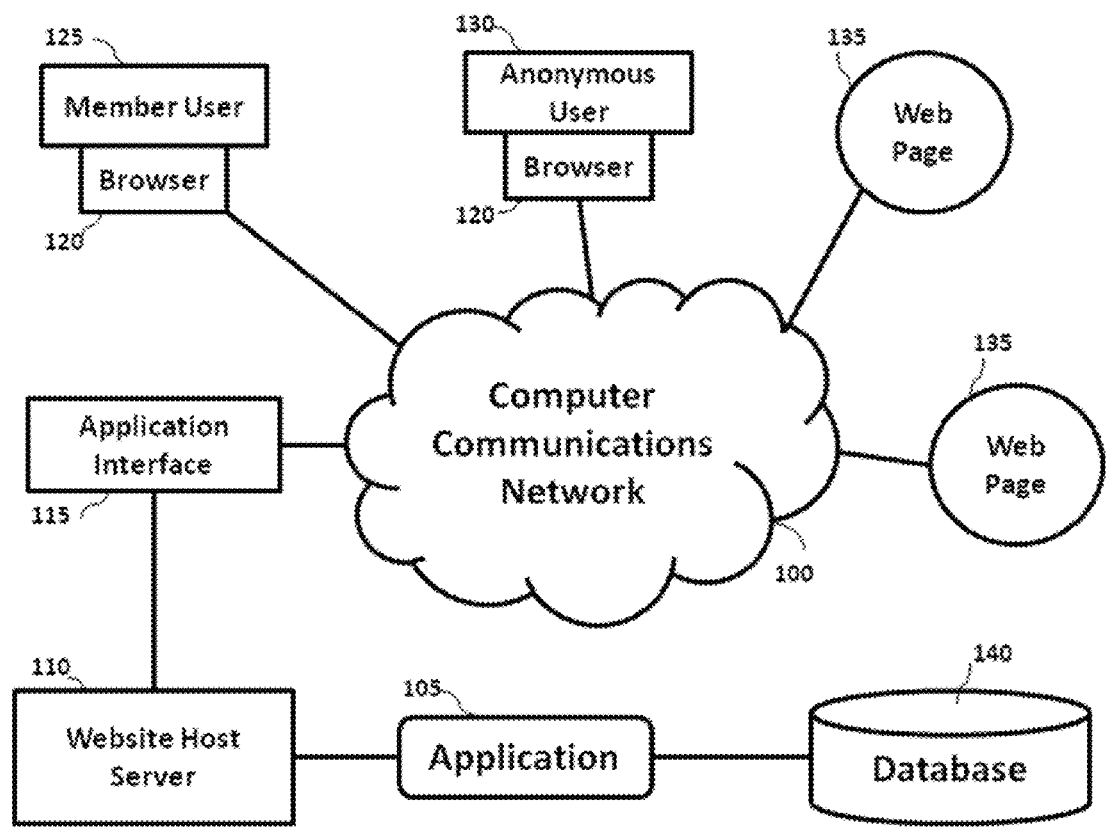
FIG. 1 is a block diagram of a preferred embodiment global environment.

A preferred embodiment of the present invention discloses a system, method, and computer program product to objectify one or more psychological and cognitive responses, and record, process and utilize the objectified response data as statistically viable input in the generation of politically and commercially viable public opinion searching, ranking, metering, and repository systems. FIG. 1 illustrates the global environment for deployment of the preferred embodiment and is not restrictive of the invention as claimed. As illustrated therein, a computer communications network 100 allows communication between said system elements: web resources, reflected as web page 135; computer program 105 and interface 115; a website host and web server 110 with database 140; and 110 member user 125 and anonymous user 130 connected to 100 via computing devices able to render and interact with 115 using browser 120.

Description of the various system environments in which 105 could operate or be delivered, and technical description of said environments' ubiquitous elemental components comprising intranets, graphical user interface (GUI) browsers, text-based browsers, toolbars, toolbar extensions, add-ons, plug-ins, servers, personal computers, mobile phone applications, PDAs, data storage devices, AJAX client-side systems, platforms, frameworks, web based applications, desktop installations, downloadable software, and other commonly used technology may obscure efforts to clearly and concisely detail the invention's novel features, and will therefore be used minimally. The ensuing detailed description of the preferred embodiment, therefore, will utilize a simplified environment as illustrated in FIG. 1 with mundane global elements interacting with computer program 105 as a web application built in ASP.NET framework with 115 interface, being hosted and deployed by 110 operating in client-server model connected to back-end 140 SQL relational database, serving GUI browser 120 enabled users 125 and 130 as they request to comment upon or bookmark web pages 135 while interfacing 115 using AJAX techniques. Those skilled in the arts can readily adapt the current invention to operate within different environments employing various frameworks, platforms and protocols not herein detailed.

Figure 2:
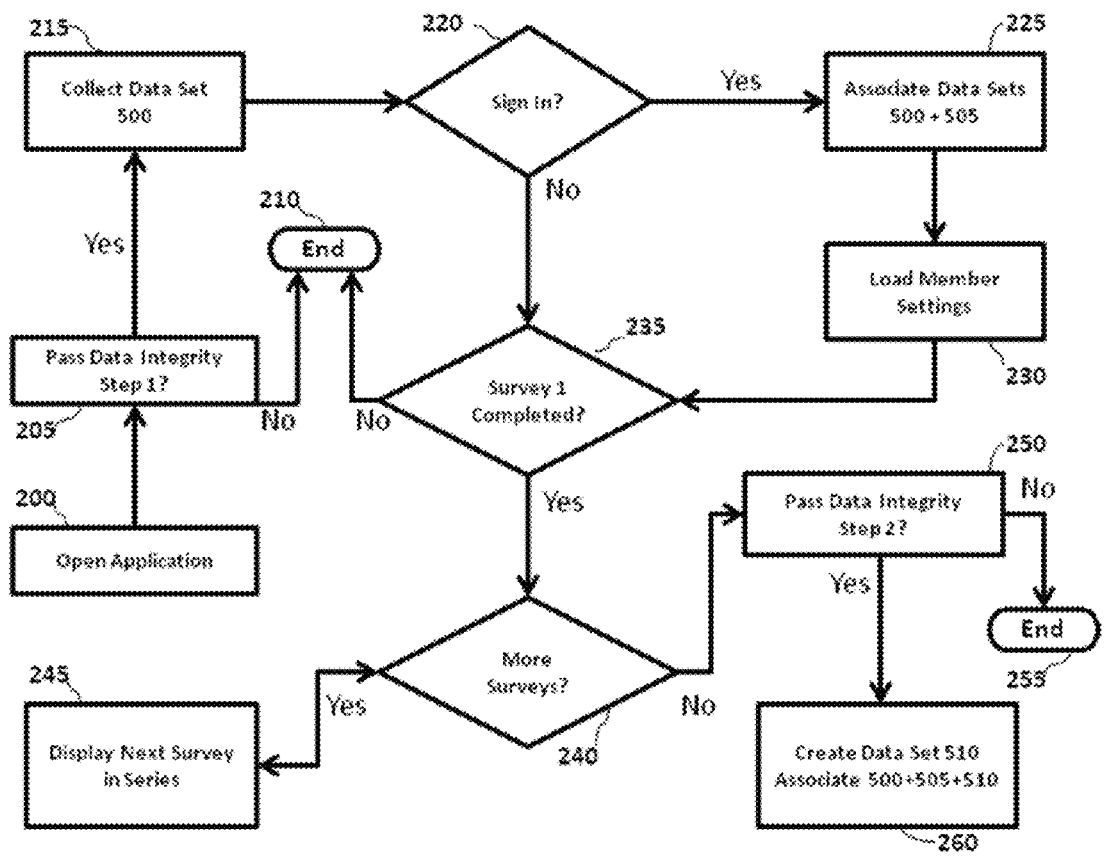
FIG. 2 is a flow chart of a preferred embodiment data transformation process.

FIG. 2 is a flow chart depicting data input and transformation in a preferred embodiment of the claimed method and computer program product. Said method begins at 200, wherein said application 105 comprises controls and instructions written in a programming language such a C# to objectify and record subjective opinions, values, beliefs, feelings, emotions, and judgments. Those skilled in the relevant arts will realize that many framework, platform, language, and logic combinations are possible to execute said method and that detail herein is exemplary only and not restrictive of application 105 or the method as claimed. In process 200, user 125 or 130 desiring to bookmark or comment upon web page 135 launches application 105 and creates a unique event ID number represented as table cell A1 in FIG. 4 Response Master File 400, typically by clicking web page 135 sharing icon linked to website 110, if present, or a browser 120 toolbar icon which launches 115. Said launching comprising a request over 100 for service from site 110 application 105 to display interface 115, which is rendered on user 125 or 130 browser 120 as FIG. 3, 300 also referred to as Survey Form 1. Alternatively, 105 may be accessed by downloaded over 100, software stored on hard disk, compact disk, optical disk, flash memory or similar media. In these and other alternative embodiments, 105 maybe present on local memory and processed by various mobile or non-mobile computing device of user 125 or 130 and utilized in online or offline mode wherein offline stored survey 300 information, from one or more surveys, is communicated to website 110 upon user 125 or 130 command at some point in the future when connected to Internet 100.

Unlike social bookmarking websites, site 110 allows comments, or judgments, without requiring membership 335 and without requiring that a bookmark is created 330. In this manner, user 125 or 130 who may wish to comment on thousands of 135 does not have to create thousands of bookmarks as well. This allows any user of 100 to pass judgment, make comments, or otherwise create metadata on any 135 for repository into 140 and public consumption. Unlike existing 135 blog posts or news articles that allow users to add comments below posts, which are only visible to visitors of said 135, 105 and the preferred method disclosed herein provide a means for said metadata regarding said 135 to enter a global measurement and repository 140 for combination and cross-reference with the whole of metadata from all 135 within 100 entered previously into 140 by any 125 or 130 users of 105. 130 users at 115 may judge 135 only 330, or judge and bookmark 135 to their machine locally 315. 125 users are not required to sign in if they wish to judge or bookmark 135 anonymously 335. 125 users who are signed in 335 may judge only 330, judge and also create a public bookmark 315 (bookmark will be publicly linked to their member ID, FIG. 13, 1310), or judge and create private bookmark 315 (bookmark accessible to 125 on member home page of 100 but not tied publicly to 125 ID publicly, not illustrated). In any case described above the judgment or opinion data they have entered regarding 135 is stored at 140 if the event is successful, and the option to submit this data anonymously is available 335 to all users.

FIG. 4 is an illustrative Response Master File, 400, which could be located in a segregated section of 140 or within memory area of 110, and stores and organizes data for bilateral communication with 140 whose database table is represented for exemplary purposes only in FIG. 5A, FIG. 5B, and FIG. 5C. For reasons of clarity the database table 140 is being represented as three tables 500, 505, and 510 referred to in FIGS. 2, 215, 225, and 260. Solely to make herein description more concise and useful, Data Set 500 can be referred to as event data, Data Set 505 as member data, and Data Set 510 as Survey data. A more accurate depiction of 140, one not limited by FIG. 5 horizontal drawing page space would place 500 in left page position connected on its right to left side of 505 which would finally connect on its right side to left side of 510. In said depiction, Column "A" of 500, 505, and 510 would appear only once, on the leftmost side of 500 as currently illustrated, and the column order proceeds in a left to right fashion ending at column "AN", or 520. It is understood by those skilled in the relevant arts that 500, 505, and 510 collectively represent the database table of 140 serving 110 and is only representative of a relational database employing SQL language wherein the ID number represented as cell A1 in 500, 505, 510, and 400 is a unique identifier for each new judging or bookmarking event, represented as a subsequent row in 140 database table. It is further understood that 140 may comprise many different models, languages, architectures, types, components, and structures whose technical description would obscure explanation of the enclosed invention, as preferred embodiments do not make claims regarding general database structure or management but rather what type of data is stored in a database, how subjective data is converted to objective data, the system and means said data is collected, inputted and for what purpose said data is utilized.

FIG. 5, inclusive, contains column header codes 525 which are used for reasons of space and clarity in place of full text descriptions for column headers in tables 500, 505, and 510. Said codes are two characters in length and correspond directly to the respective two character cell locations on FIG. 4 Response Master File, 400. To illustrate, FIG. 5A column header code 515 "C3" corresponds to 405, or cell C3 on 400, which in this case is the table cell storing the time of a metadata response event in Pacific Standard Time. 140 Database table 500, 505, 510 and Response Master File 400 maintain permanent column headers and cell spaces, respectively, for all possible inputs from each response event. Each row in 140 comprises a new response event with a new ID, 400 cell A1. The number of 140 column cells per said row which will be populated with values depends on available event data 500, member data 505, and respondent survey inputs 510.

FIG. 2 process 205 is a representation of a sample Data Integrity Step 1 in which application 105 programmatically adds user 125 IP address to cell A2 of 400 and cross-references database 500 and 510 columns coded A2, C1, B4 and B5. These columns in cross-reference will dictate whether or each response event can proceed as the preferred embodiments of 105 logic limit one IP address (A2) bookmarking and/or judging one 135 URL (C1) one time regarding 135 creator (B4) and one time regarding 135 content (B5). If database 510, codes B4 and B5 both contain a value of 1 when cross-referenced to this user IP address (A2) and URL (C1), then process 205 results in NO and 210 after displaying a message to user indicating they have already judged both the creator and the content of their requested page (not illustrated). If either B4 or B5 is a zero, then process 205 is YES and bookmarking and/or judging event may proceed. If any prior 125 or 130 response to a given 135 URL did not reach FIG. 7, 700 during the event process, wherein a respondent clearly indicates that the object of their judgment is either content or creator 715, then 105 logic inserts a value of "1" in 510 column code B5 for said event indicating content judgment occurred and allows a subsequent judgment on said 135 URL creator only, after display of user message indicating such (not illustrated). In this manner, Data Integrity Step on restricts each 130 or 125 user to a total of two judgments per 135 URL, one regarding content and one regarding creator. This Step helps prevent abuse of 105 motivated by self promotion or other reasons and the foregoing description of this Step is meant to be representative only, and is not restrictive of the numerous methods those skilled in the art could devise to protect the integrity of Data.

FIG. 2 process 215 depicts the population by 105 instruction and logic into 400 of event ID, time of event, user 125 IP data, 135 URL and said URL components, 135 meta elements, and total count of database 140 existing response events for said 135 URL as seen in the following, respective cells of 400: A1, C3, A2, C1, D1, E1, F1, G1, C2, D2, E2, F2, and G2. This set of data, able to be transmitted from 400 to 140 for storage is collectively referred to as Data Set 500, or event data, at process 215 and is described for explanatory purposes only, not limiting by claim or by method of the invention disclosed herein, as one skilled in the arts will realize that a variety of other geographic, network analytic and inferred data could readily be collected into 400 at process 215 for potential storage at database 140 segment 500. Data Set 500 will name a 135 creator with 105 programmed population from cell D1 on 400 containing 135 URL hostname. Data Set 500 will name content of 135 with 105 programmed population of cells D2, E2, F2, and G2 from 400 containing 135 meta elements. Should the bookmarking event be completed, Data Set 500 would be permanently added to 140 from 400. In the event of an aborted attempt or failure to pass additional data integrity tests, all information collected on 400 is erased and no database entry is recorded, although separate memory areas of 110 may capture analytical event data to measure how many visitors are rejecting to complete 300, and other information relevant to 110 administrators. The foregoing disclaimer and database entry methodology apply equally to Data Set 505 and Data Set 510, FIG. 2, 225 and 260.

FIG. 2 decision 220 YES allows 110 members to sign in via a typical username and password method and populates member data 505 stored in 140 into 400 in process 225. Process 230 would make available member 125 preferences, files and other personalized settings stored in 110 or segregated 140 area to customize 125 experience with 110 at 115. Purely for illustrative purposes, 505 member data depicted as stored with column codes B3, C4, D3, E3, D4, E4 with corresponding data fed during process 225 into the respective cell locations and respectively identifying the following information on 400: membership y/n, member ID, country, age, sex, and total number of existing bookmarks for said member. Those skilled in the arts related to social network websites and their related databases are familiar with the large quantity of categories and types of membership information that can be collected from profiles, sign up forms, site usage statistics, URLs selected to judge or bookmark, URL links added as metadata, subjective textual, image and interactive content added as metadata, and the commercial value of possessing such detailed information about individuals as related to marketing and other opportunities. The aforementioned membership information and novel membership information is readily collected and utilized by the enclosed invention within 505.

Figure 3:
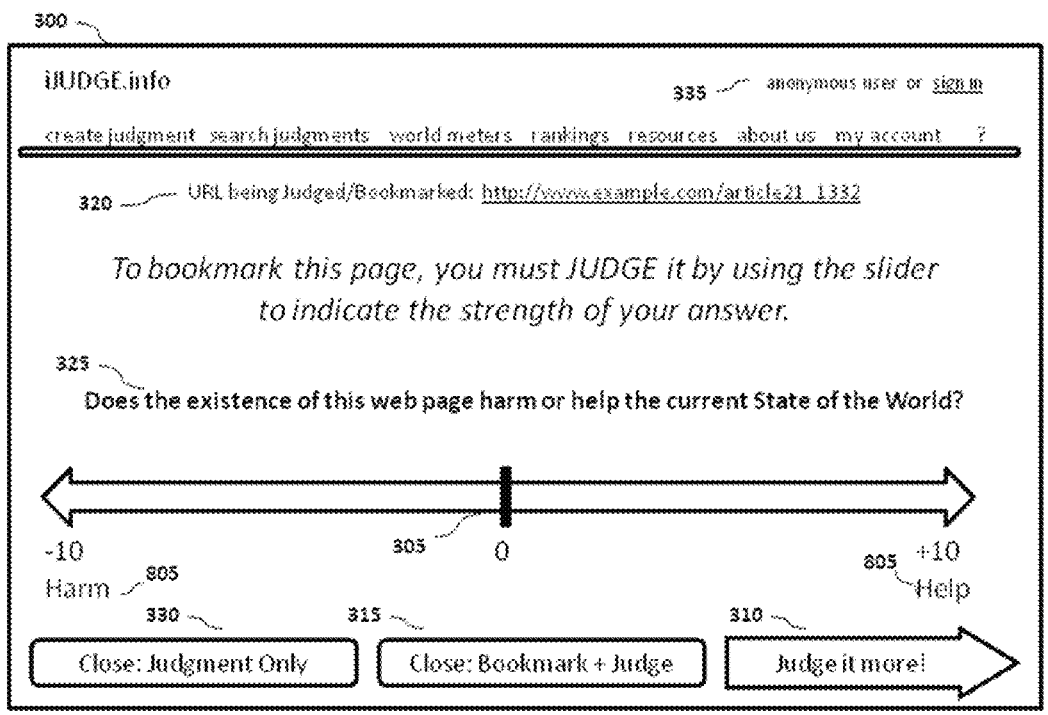
FIG. 3 is a sample Survey Form 1.

A NO response to decision FIG. 2, 220 causes no 505 data to be loaded into 400. At process 235 anonymous 130 and member users 125 view Survey Form 1 or 300 as illustrated in FIG. 3 showing web page 135 link to be judged or bookmarked 320 and are able to indicate their answer to question 325 by moving a graphical slider 305. If 305 is moved by any amount in any direction, a non-zero mathematical value is registered and stored in 400 cell F6 or G6 for potential feed into 510 at process 260, and decision block 235 is YES with proceed function 310 programmatically becoming activated for use. For exemplary purposes only and in no manner limiting the disclosed invention, said 305 is calibrated to two decimal places and indicates strength of preference between one left side and one right side controlled answer to Survey questions. If 305 is moved towards the right side answer choice the preference indication is a positive number stored into appropriate cell of 400 and 510 with a maximum value of "10.00", or a negative number with maximum value of "−10.00" for indications favoring left side answers. Activation of save/close function 315 or 330 is NO to decision block 240 moving event to process 250 unless 315 or 330 is activated before 305 has registered a non-zero mathematical value, in which case the user is informed they will be exiting without creating a judgment or bookmark and 210. No 305 movement at process 235 will result in message to user asking if more time is required and subsequent 210 if no 305 movement is registered thereafter. At process 250 users, also referred to herein as respondents, must pass Data Integrity Step 2, illustrated with 250 embodied as a CAPTCHA mechanism in FIG. 10, which also provides a simplified view of system progression and exit options for post 235 YES events wherein 1010 represents the final Survey in a given series or the final Survey a user desires to complete.

Figure 6:
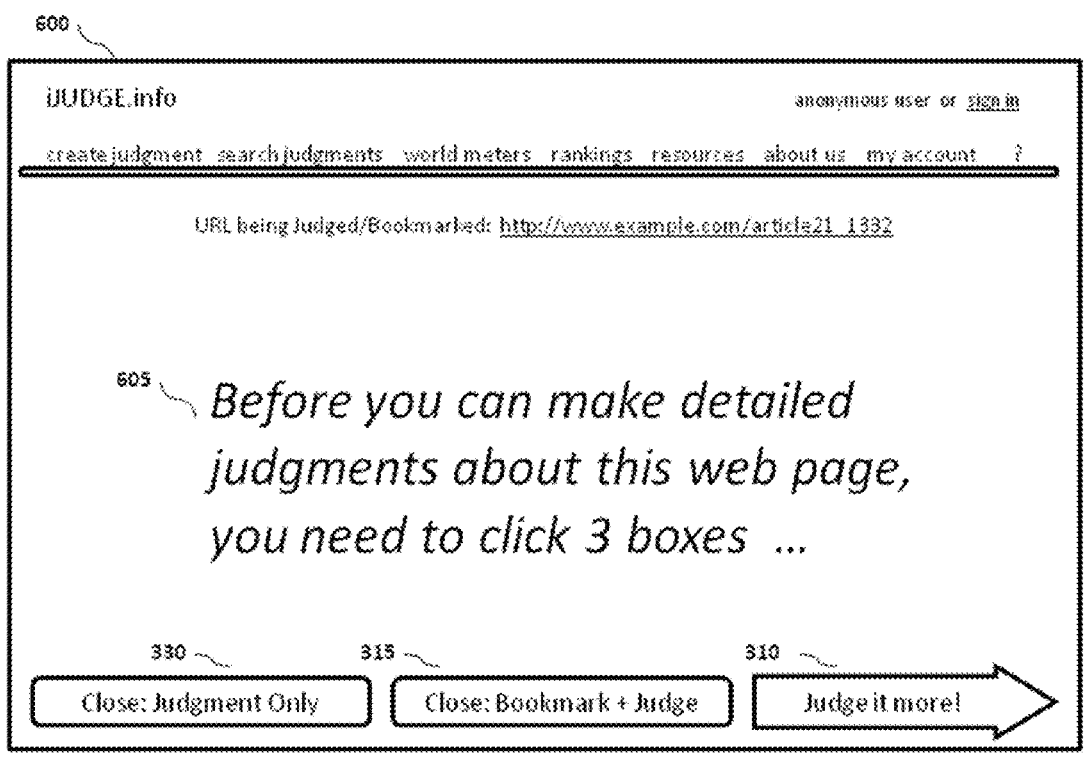
FIG. 6 is a sample of Survey Form 1A.
Figure 8:
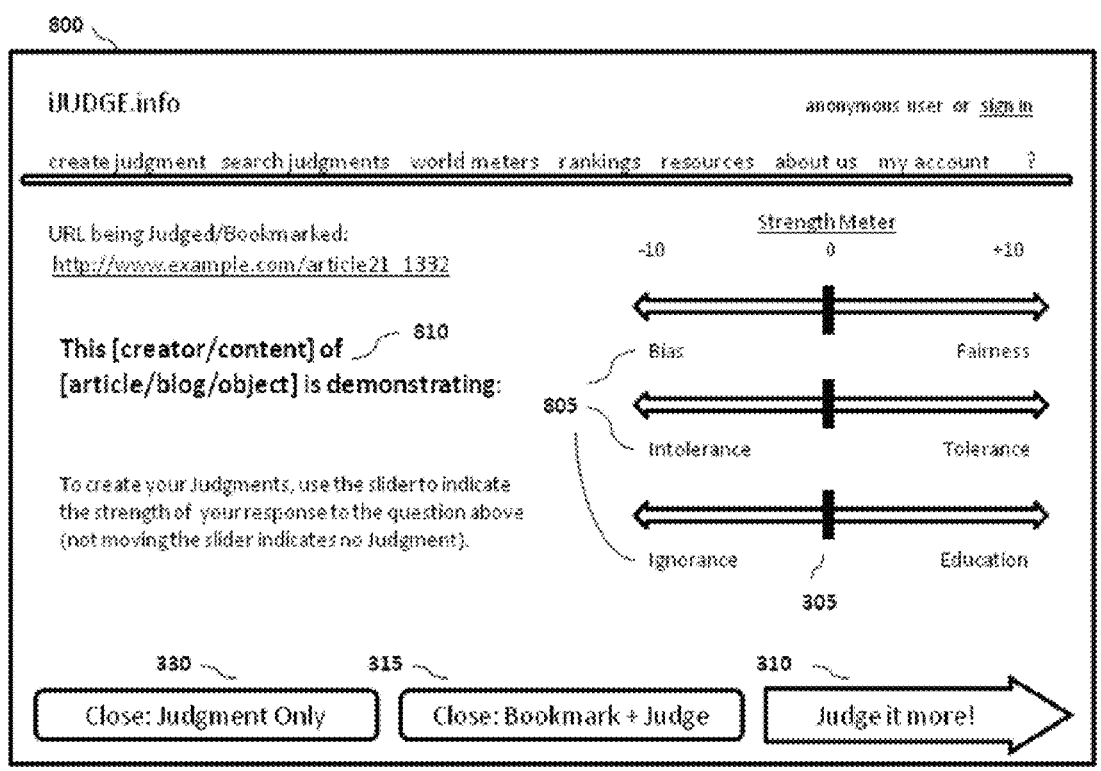
FIG. 8 is a sample of Survey Form 2.
Figure 9:
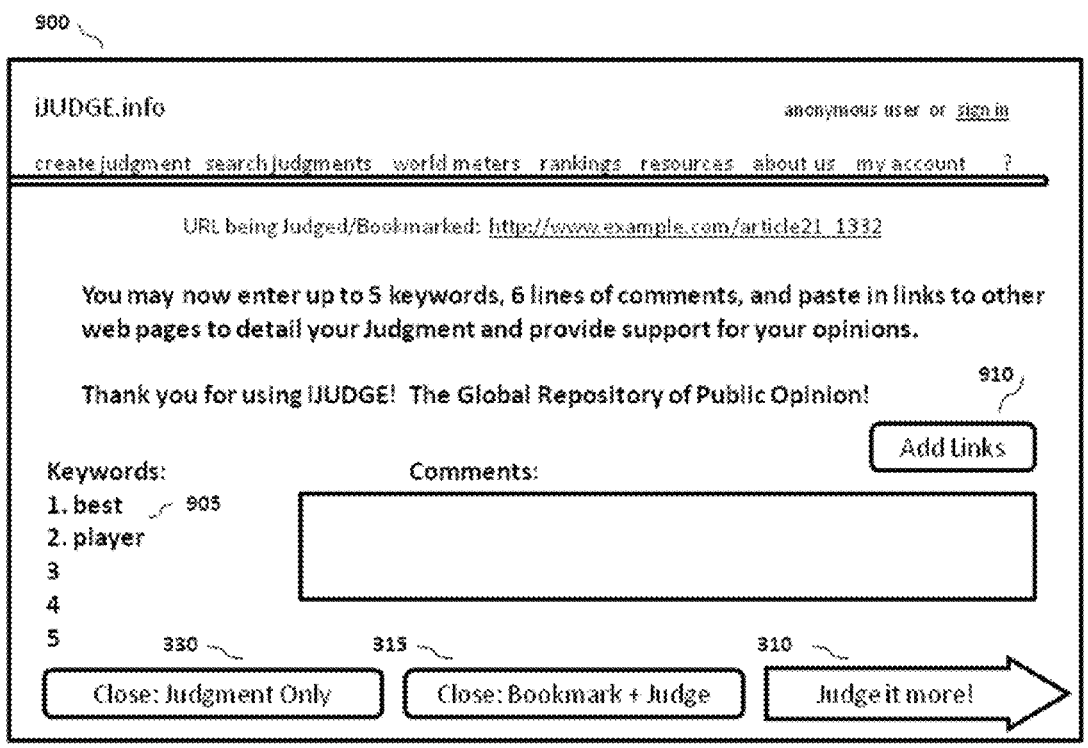
FIG. 9 is a sample of Survey Form 3.

User selection of activated 310 function creates YES for decision block 240 and displays Survey Form 1B or FIG. 6, 600 while engaging the looping decision and Survey Form display processes 240 until 1010. Examination of FIG. 7, FIG. 8, and FIG. 9 illustrate some of the Surveys 700, 800, 900 that could appear during loop 240, for exemplary purposes only and in no manner restrictive of the disclosed invention or of the particular embodiments discussed herein.

One skilled in the relevant computer arts understands that the method as detailed in the preceding steps, generally, employs data integrity mechanisms 205, 250 to universally deliver controlled vocabulary survey forms 235, 240, 245 and generate objective, mathematical 305 responses to structured questions 325, 810 and answers 805 from anonymous 130 or member users 125, wherein a given amount of content and creator data 500 of web pages 135 and respondent information 500 from process 215 is linked to said forms questions and answers 400, therein generating a 140 data table with significant cross-reference output available even if the totality of respondents complete Survey 1, 300 only, and proceed to none of the later series forms which collect more classified, detailed, and significant opinion data: 700, 705, 710, 715, 800, 805, 810, 900, 905, 910. One embodiment not only populates 135 meta elements 500 for content description and data table 140 assignment 400, but also captures the entire markup language content of said 135 for processing by algorithm and increased levels of 135 subject matter as cross-reference fodder for said questions and mathematical responses. Alternatively, and in preferred embodiments herein detailed, persons skilled in the arts relating to the fields of psychology, cognitive response, polling, and statistics, by employing strategic use of survey forms 300, 600, 700, 800, 900 and precise structure to said controlled vocabulary questions 325, 810 and answers 805, can utilize embodiments of the disclosed method to produce auditable results with potentially greater impact and meaning than can be obtained by using generic surveys, ambiguous vocabulary, and utilization strategies reliant upon complex algorithms attempting to decipher accurate opinions and values from enormous volumes of raw source markup language 135 data.

FIG. 6 Survey Form 1A, or 600, and 300 noted previously, help illustrate the a preferred method of generating meaningful public opinion data utilizing strategically designed controlled vocabulary and interface format, as opposed to embodiments that emphasize computer algorithms. Vocabulary selection of Question 605 and form 600 show emphasis on simple, clear language that helps, in combination with respondent ability to proceed 310 or exit 315, 330 at any time, create relevant qualities to the user experience: a) the user is in control, b) they can answer no Surveys 235 or as many as they like up to series end 240, and c) they are in an informal setting where they can retain anonymity 220 if they choose. Those skilled in the relevant arts can see how using this structure throughout this embodiment's response collection process can help create a higher percentage of responses from motivated users. Users not motivated or concerned about the content or creator of 135 would, a) possibly not ever request to comment upon or bookmark 135, b) possibly terminate at 110, or c) possibly respond to 300 and exit at 600 using 315 or 330. Respondents using 310 to voluntarily move deeper into a Survey series, up to and including the final series form 900 which allows the entry of unstructured tags, comments, and links as illustrated in FIG. 9, would therefore likely be exhibiting a higher level of motivation with more specific 700 and meaningful 800, 900 input relating to 135 creators and content. Typical weaknesses in polling systems such as coverage bias, non response bias, and response bias are addressed by the system of the preferred embodiment of the invention as it offers permanent, ongoing surveys at no cost or obligation to respondents, can be answered at any time of night or day anywhere in the world, are random and anonymous, and are capable of creating an increasingly larger sample size over time.

Figure 7:
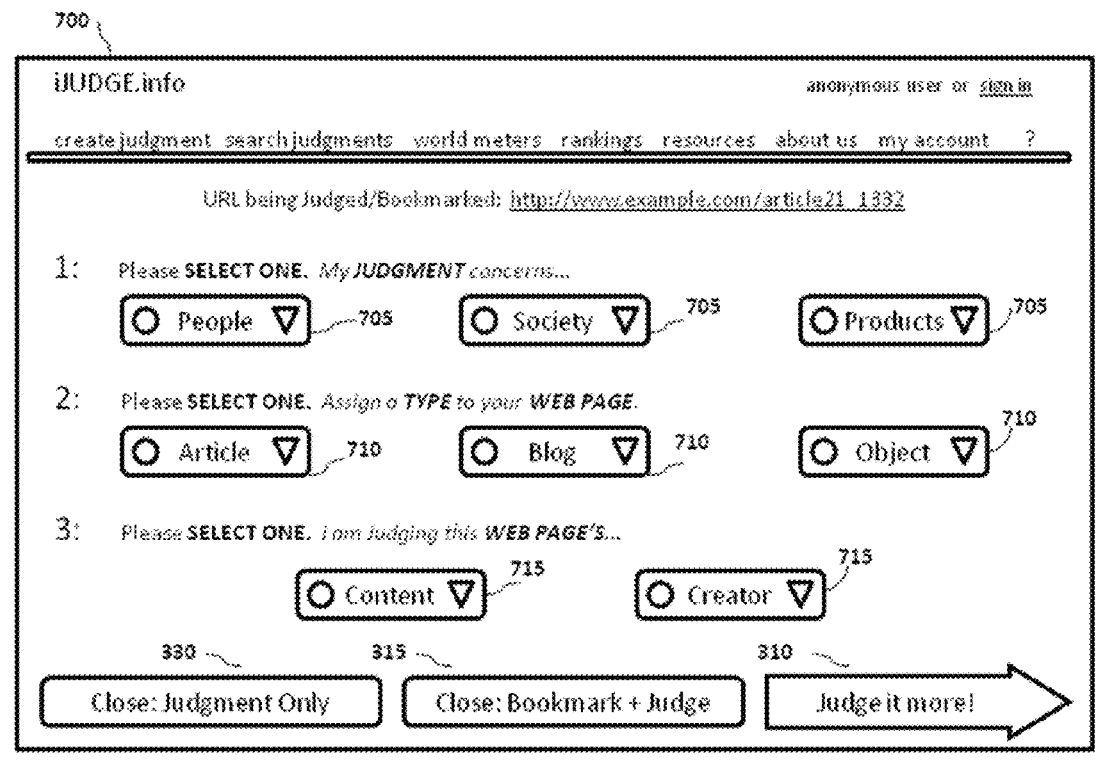

Survey From 1B in FIG. 7, 700 illustrates in exemplary and non-restrictive fashion only, how the structured format is utilized to collect 135 metadata category division 705, 135 type classes 710, and 135 metadata distinctions between opinions regarding 135 creators versus 135 content using 715. 705, 710, 715 provide drop down menus for users seeking to classify to more specific levels. It is understood by those skilled in the art that a wide range of choice exists for the exemplary 700 vocabulary, categories, drop down choice quantity and vocabulary, and display options, including non-graphical display, and that 700 is merely a representation that provides for concise illustration of the invention's capacity to create standardized metadata. Data collected from 700 and any ensuing Surveys is populated into 400 for storage into 140, segment 510, should respondent pass Data Integrity Step 2 at process 250.

It is understood that because 705, 710, and 715 each can offer drop down choices that a large number of possible categories, types, content classes, and creator classes would maintain permanent column headers in database 140, section 510 and that the enclosed illustrations are exemplary only. By viewing 400 and 510, one example of categorization data population is offered herein: the "People" categorization function 705 offers a drop down list (not illustrated) including "sports" in this list, further allowing, in some embodiments, the user entry of 2 user entered keywords for additional specification. In this example, "Michael Jordan" was typed into this hypothetical keyword area. The resultant data is now seen in 400 as follows: B7, B8, and B9 contain values of 1 denoting category and drop down selection and C9 captures the entered keywords "Michael" and "Jordan". New data would be added to 140, section 510, should this event not be aborted and should the user pass 250, Data Integrity Step 2. This outcome is reflected in 510 under the column headers corresponding to the 400 cell locations above: B7, B8, and B9 (C9 text not illustrated in 510 due to space limitations but would list keywords noted above).

FIG. 8 further illustrates 105 programming and logic of 400 data population, database 140 construction, and claimed controlled vocabulary methodology. 800, Survey Form 2, illustrates how 105 can employ strategic consideration of format and vocabulary choice for programmed answers 805 to programmed questions 810 and evoke concise, meaningful and useful responses from respondents by employing answers 805 comprised of a word paired with its opposite. 810 illustrates how preferred embodiments of 105 program will alter 810 based on function 710 and 715 selections by showing that the underlined words 810 can be interchanged programmatically. Sliding scale 305 provides mathematical responses populated into 400. As illustrated, cells F7 and G7 of 400 show values "Bias" and "Fairness", the topmost 105 programmed controlled answer paired opposites from 805. These two values would occupy fixed column headers on database 140, section 510 and permanent cell spaces F7 and G7 on 400 whether or not a respondent answered this question. As illustrated, 400 shows a value of "0.00" in cell F8 and "7.93" in cell G8, indicating that a respondent moved the slider 305 in topmost answer set 805 to the right, indicating his agreement with the word "fairness" in response to question 810, for a measured value of 7.93 (final slider position not illustrated herein). If the response had indicated agreement with "bias" at 805, a negative number to two decimal places would have been registered in cell F8 of 400 and a "0.00" in cell G8 of 400. Every answer set responded to by use of 305 produces a "0.00" value for the non-selected answer choice and either a negative or positive value to two decimal places for its paired opposite.

FIG. 9 illustrates Survey Form 3, an unstructured metadata collector which is presented last in the preferred embodiment, after a predetermined number of forms have collected objective metadata and mathematical responses. In this simple example we see "best" and "player" have been entered in 900 at 905 by the respondent. This data is populated into 400 in cell C16, use of keywords is noted at cell B16 with value of "1" indicating use and "0" indicating non-use. If the event is completed successfully, said values populate database 140, as seen in 510 under column codes corresponding to 400 cell locations, B16 and C16.

Figure 10:
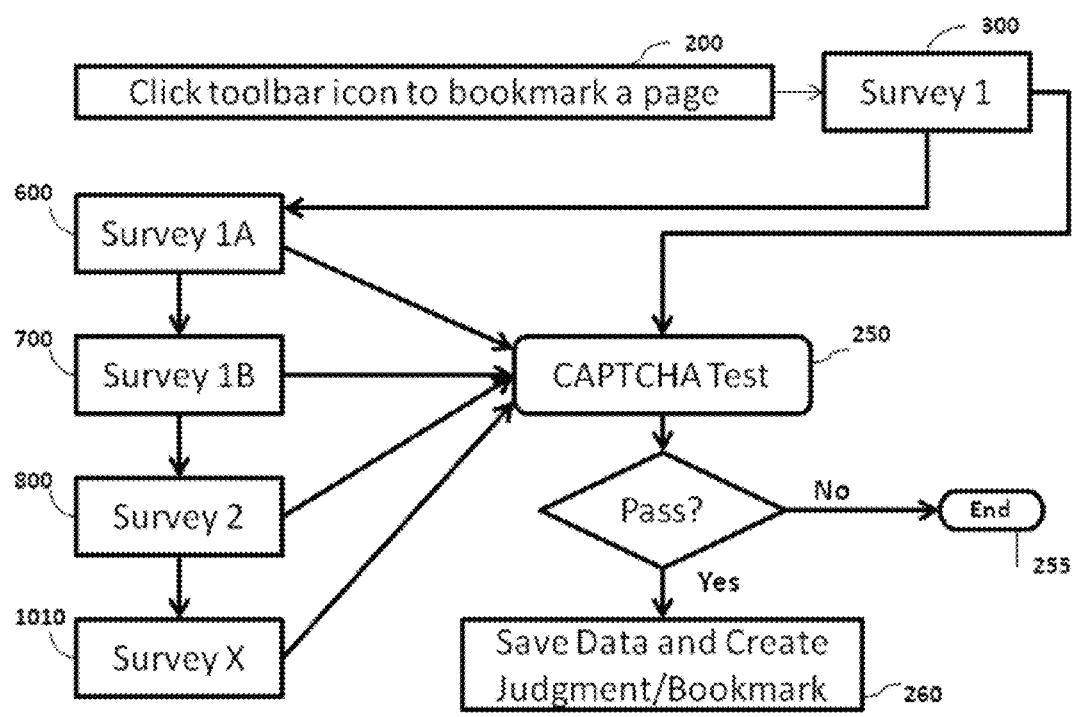
FIG. 10 is a flow chart of Data Integrity Step 2 and exit modes.

FIG. 2 and FIG. 10 now provide a framework for detailing a range of outcomes from user interaction with 105 at 115. Users ending at 110 or 255 have added no data to 140 and all populated 400 data is discarded. Anonymous user 130 reaching 260 has added at least some 500 and 510 data to 140. Member user 125 reaching 260 has added at least some 500, 505, and 510 data to 140. At event 260, 105 has enabled 140 to link at least all of the following together from each said event (simplified here, detailed below): one 2-step verified user IP containing at least some geo-location data; one URL; one said URL creator and some said URL content; some web analytic event data; available member data if 260 is member related; at least one controlled vocabulary question regarding said URL; at least one controlled vocabulary answer word; and a precise numerical score for said answer word. In this manner, 105 as embodied heretofore, transforms articles of discovery into articles of measurement. Existing browsers, AJAX client side technologies, servers, websites, blogs, search engines, search algorithms and systems of advertising create and/or utilize metadata using subjective means (keyword tagging, for example) generally to enhance and personalize the search, discovery, and extraction process while using 100. In the disclosed and other embodiments, by novel means described herein and by others not described herein, subjective metadata previously useful only for search and discovery is collected in a process that allows its transformation into mathematical data that is inherently useful, dynamic, global, composed of auditable elements, and conducive to complex relational cross-reference and reliable statistical opinion output.

This non-limiting embodiment describes a novel bookmarking, web page commenting, and public opinion measurement and repository methodology that lies in contrast to current social bookmarking websites, blog and article comment sections, and other current Internet metadata creation, collection and usage mechanisms that do not employ, in general: data integrity controls 205, 250; programmatically captured 135 content and creator names 215; 135 URL and event analytic information 215 (other than URL for current web-based bookmarking systems); programmatically captured member information 225 (except in case of current social bookmarking website); structured vocabulary questions 325, 810 to create objectified metadata 305, 805 for 135; mathematical measurements 305 of each metadata response 805; standardized metadata division by category 705, type 710, and creator vs. content 715; anonymous 130 or member 125 usage in a controlled vocabulary setting 335, 300, 600, 700, 800; voluntary metadata capture environment with controlled vocabulary in addition to assessment measures of respondent motivation levels 310, 315, 330, 240, 245; environment providing for combination 240 of subjective metadata 900 with controlled vocabulary and mathematical metadata FIG. 10; and controlled vocabulary 135 metadata answer choices comprised of a judgment or value oriented word 805 paired with its antonym separated by a graphical sliding scale 305 for mathematical recording of indication of preference scores.

The use of 805 helps to reduce or eliminate survey wording bias by offering, at all times, both extremes of possible answers to all 135 related controlled vocabulary questions 810 in a range that allows respondents to indicate precisely how strong their preference is for one answer or the other. The allowance for anonymity 130, 335 reduces response bias of current polling systems, wherein respondents may feel embarrassed to admit certain sentiments to in-person or phone polling workers, and thus not reveal their true opinion.

Embodiments employing varying strategies within controlled vocabulary question 810 and answer sets 805 can produce output focused on the goals desired by 105 controller and programmer. The preferred embodiment herein illustrates a strategy designed to yield politically and commercially viable and marketable public opinion information by asking serious and relevant questions whose controlled vocabulary possible answer choices comprise two antonyms. When each of these words is of a definite nature 805 reflecting a human value, judgment, belief, opinion, or feeling, and by further allowing respondents to mark their preference anywhere between the range 305 comprising the two antonyms, 105 captures precise sentiment. One skilled the arts can readily design and program 105 to various embodiments including those designed for operation in non global environments, such as corporate intranets, with different strategies and vocabularies employed for customized solutions requiring precise measurement of respondent sentiment towards any set of 135 resources.

Those skilled in the relevant arts understand that survey and polling samples of as many as 1000 individuals is often considered a large enough sample of a given population whereby extrapolations and inferences can then be made regarding the entire said population. A sample size of 10,000 persons is considered extremely large. By transforming articles of search, transaction, and information exchange (100, 120, 135, 110) into articles of mathematical public opinion measurement, 105 inputs into 140 may easily capture response data from 10,000 or more individuals, possibly orders of magnitude more. 105 creates subsets of said response data by allowing division of total responses by category 705, web page type 710, content or creator 215, 715, 500, and by subject keywords 215, 500, 900, 905, 915. Using relational cross reference of table 140 elements containing the specifications noted above, many survey population sizes of 1000 or more can be created that relate to specific events, topics, issues, people, places and things. For this reason, and to reveal exemplary utility, FIG. 11, FIG. 12, FIG. 13, FIG. 14, and FIG. 15 illustrate sample 115 output mode screen shots and lay a foundation for discussion regarding 140 outputs, all such discussion exemplary and in no manner limiting of the disclosed invention.

Figure 11:
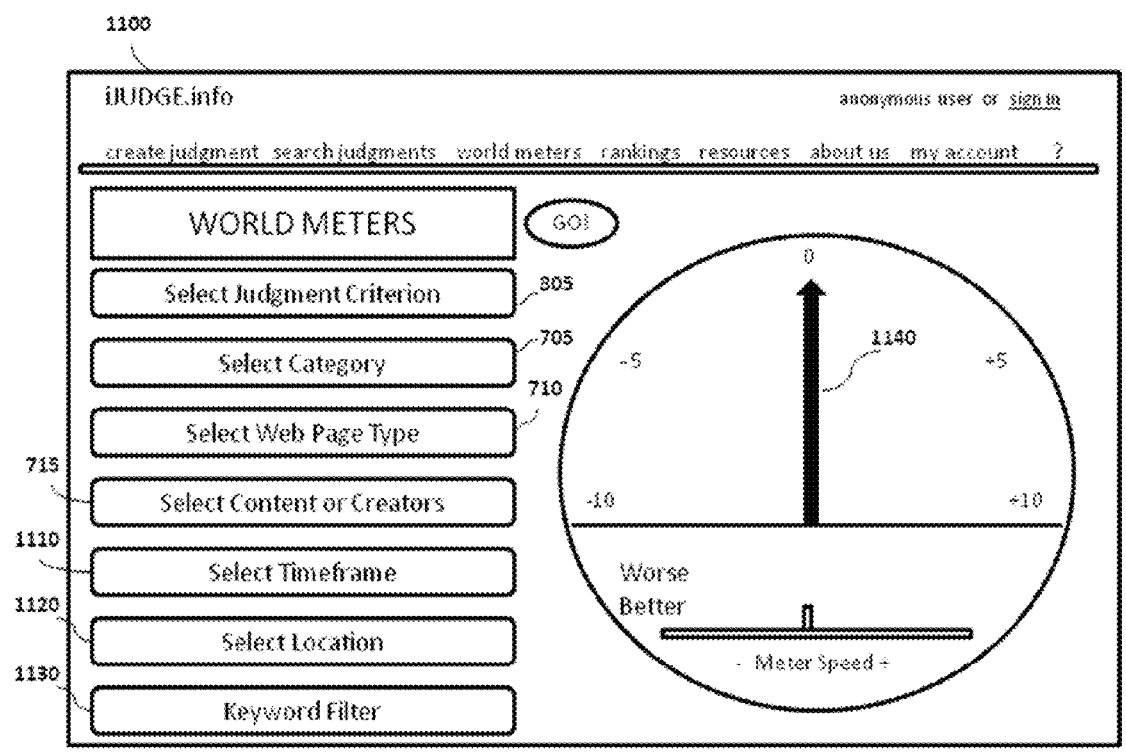
FIG. 11 is a sample Interface in World Meters mode.
Figure 12:
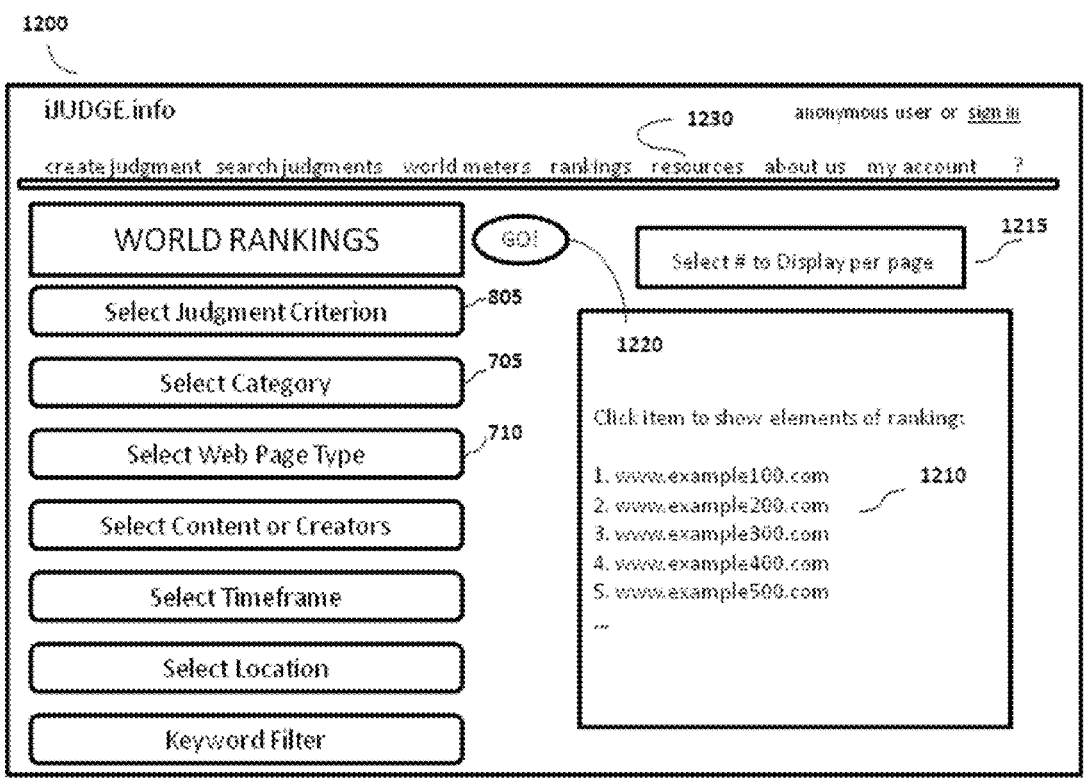
FIG. 12 is a sample Interface in World Rankings mode.
Figure 13:
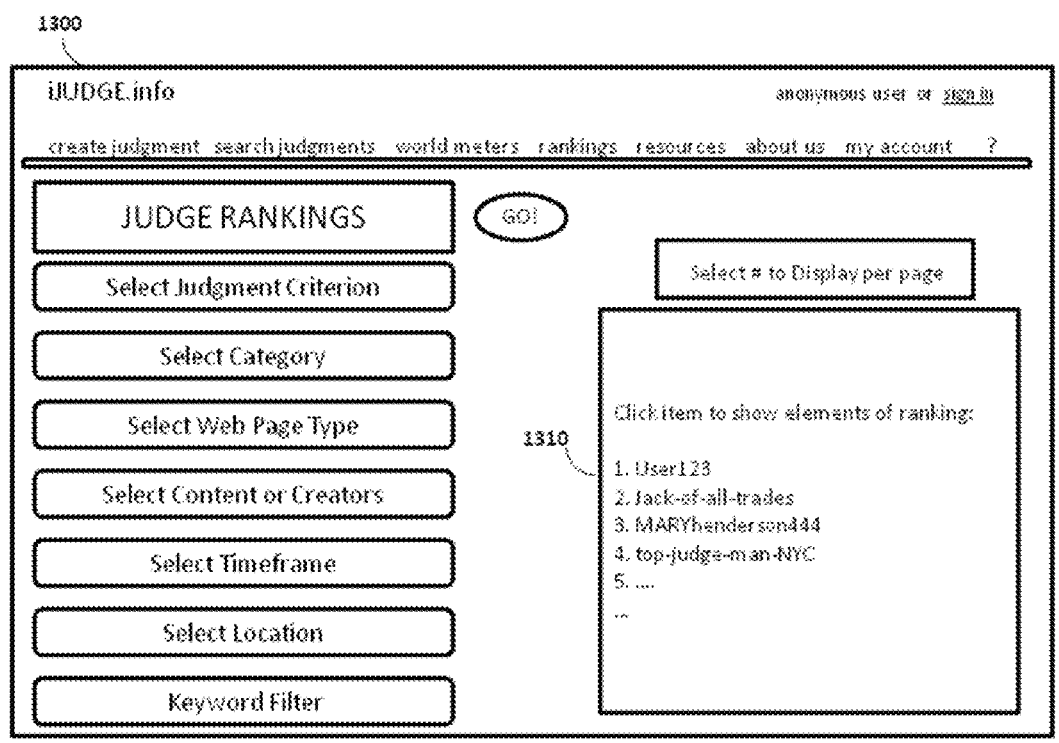
FIG. 13 is a sample Interface in Judge Ranking mode.

140 output is computer controlled, hosted by 110 and graphically interfaced by users at 115, detailed by example only as a myriad of choices is realized by those skilled in the art once any database of the nature described herein begins to accumulate a quantity of response inputs. 140 outputs may be displayed in meter mode 1100. FIG. 11 shows that with no filters selected, the meter yields a world measure 1140 of 105 system's collective response to the content of the Internet, or the sum of 305 preferences to question 325 which is universal to all system users. Embodied versions count each response as one multiplied by the 305 indicated two decimal place score. Selecting a timeframe 1140 yields a dynamic 1140 movement over selected frame at selected speed. Filtering is accomplished by clicking filter button 805, 705, 710, 715, 1110, 1120, 1130 and choosing from drop down lists for specific selection of terms (not illustrated herein but detailed and discussed previously) that will appear via AJAX technologies in preferred embodiments. Any combination of filtering and cross-reference is possible as it is understood by those skilled in the arts that these abilities are inherent to the nature of relational 140 or network databases, among others. 125 or 130 users may filter by judgment criteria (a drop down showing all system controlled vocabulary answer terms 510, 805), by category 510, 705, by type 510, 710, by creator vs. content judgments 215, 500, 510, 715, by timeframe 215, 500, 1140, by location 215, 500, 1120, or by keyword 215, 500, 900, 905, 915, 1130 (drop down is a query entry search bar similar to 1410). FIG. 12 and FIG. 13 show ranking mode, wherein the filters and preferences yield user selected results per page 1215 and results of the ranking 1210 which are URLs with the top ranking as filtered. In any mode, generalized results may always be refined and narrowed by query or keyword 1130, which uses programmatically captured 500, 505, and 510 data as well as any subjectively entered keyword data from 510 to match queries and extract results applying typical database search algorithms and computer programs employed across the Internet by those skilled in the art of database management.

Each 105 system judgment criteria controlled word answer choice maintains a column in the 140 data table section 510. Each survey scored answer word that a left side range 805 word will have negative mathematical values in its corresponding event rows and right side 805 range words will be scored in positive numbers. A score of "0.00" is always placed in the cell for the unselected antonym in each event. Therefore the top "negative" judgment 805 (bias, intolerance, ignorance) or left side answer will be the one with the most negative score for whatever cross reference is requested. The top positive judgment 805 (fairness, tolerance, education) will be the control answer with the highest positive score. All response events present at least one completely universal Survey, 300, to all respondents concerning any web page 135. Any presentation of alternate series would affect only surveys displayed after 300 and alternate series would only occur wherein a slightly different series based on FIG. 7, 705 and/or 710 selection was strategically crafted and programmatically delivered by 105 to common selectors of 705 and/or 710. For example only, a survey series might contain more appropriately worded questions and answers for users selecting "Products" at FIG. 7, 705 wherein the questions focused more on product quality issues and how they would rate value, ease of use, etc. In any case of 105 embodiments using alternate survey series, Survey 300 would remain universal to all response events.

It is now apparent to those skilled in the arts that with a generous population of users and response data that 140 output can be of significant importance politically and commercially. The preferred embodiment utilizes several Survey forms similar to 300 and 800 containing powerfully worded questions with controlled vocabulary paired opposite answer ranges designed to deliver deeply meaningful public opinion measurements. The preferred embodiment described herein creates a reverse lookup global public opinion directory in this manner. Normal public opinion polls pose a question first and then provide answers. The embodiment disclosed herein provides the answers first and then lets users find out the top 135 content and creators evoking such reaction and sentiment in a precise and highly customizable fashion. For example, in FIG. 12, 1200 users of 105 via 115 can select (all drop down text in quotes not illustrated) "bias" at 805, "politics" at 705, "blog posts" at 710, and "100" at 1215, and initiate search 1220. That user would see 1210 the top 100 URLs judged as having bias, categorized as blog posts within the category of judgments concerning politics.

Although one skilled in the relevant arts can see that the method herein disclosed could provide for many scoring systems, rules, and allowances, a exemplary scoring system is described below to provide comprehension of a preferred embodiment only, and in no manner to limit the disclosed invention. Using the example above for discussion, all scores per URL derived directly from 140 data and any selected filters. In this example, assume that the selected filters 805, 705, and 710 narrow down the entire universe of URLs in the system (FIG. 5A, 500 column header "C1") to a subset of 10,421 URLs in 140 rows cross referenced to a fixed 140 "bias" column as having a negative value (because it is a left side word choice the value would be a negative) and a "1" in the cell for fixed 140 column headers for "politics" and "blog posts" category and type (these are not illustrated in detail but inferred by viewing 400). The number one ranking from the 10,421 URLs would equal the URL with the highest cumulative negative score. If one user marked URL "X", belonging to the subset of 10,421, one time with a "−10.00" for "bias" and that was the only time URL "X" is noted in the subset, URL "X" has a total score for this filtered request of "−10.00". If 5000 users marked URL "Y" one time each with a "−2.00" for "bias", then 5000 of the 10,421 URLs in said subset would be URL "Y" and its total score for this filtered request would be "−10,000". In this manner are rankings and measurements obtained within preferred embodiments of 105.

FIG. 13 shows an important distinction in the preferred embodiment between world rankings, wherein results are the top scoring (either most negative score for left side criteria or most positive score for right side criteria 805) user member names 1310, as opposed to URLs 1210. Additional categories not illustrated could allow filtering by number of evidence links posted 910; any number of other social network building, advertising revenue and entertainment possibilities are quickly comprehended by those skilled on the relevant art as pertaining to the social web.

Figure 15:
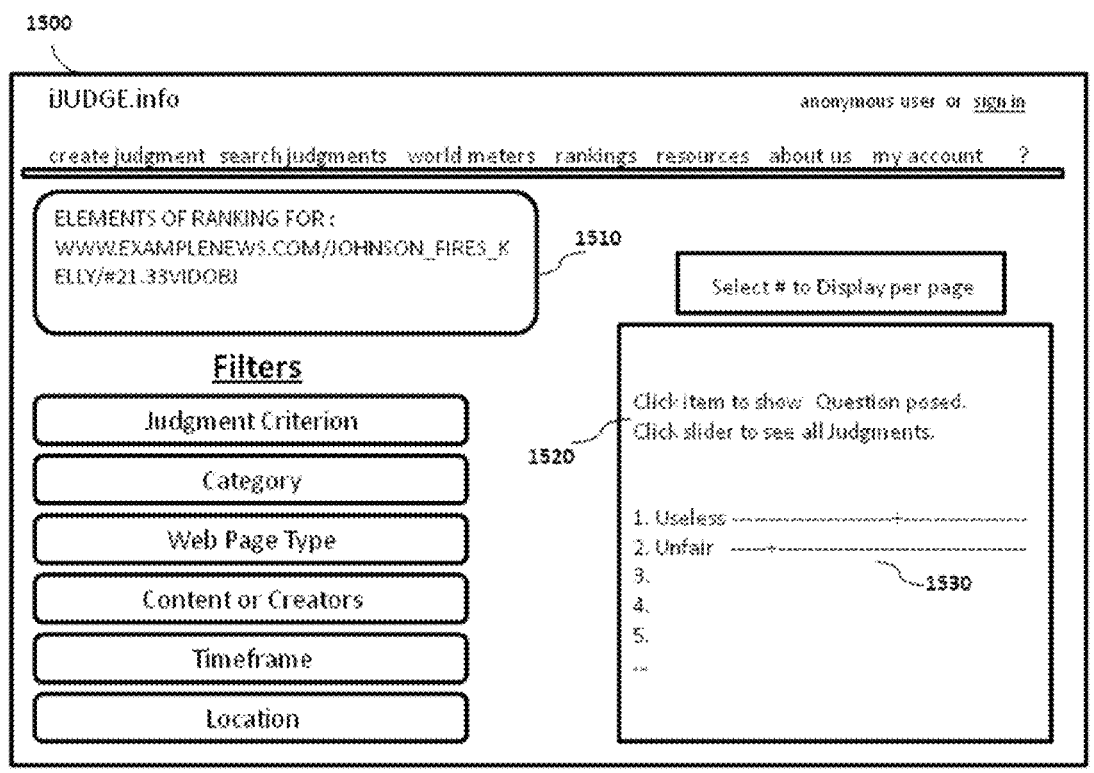
FIG. 15 is a sample Interface in Audit mode.

FIG. 15 shows, in exemplary and non-limiting fashion only, a screen shot of 115 in audit mode wherein a ranking or query search result 1210, 1420 is clicked to learn more about why that URL scored the way it did. The resultant screen is exemplified 1500 showing the site URL 1510 and providing means 1520 to dig deeper and display the questions behind the displayed scores 1530 and even each response that made up said score by providing some of the 400 master response file information for display (not illustrated). Those skilled in the arts realize the powerful financial implications of this strategy as a creator or subject of a web page 1510 might have many reasons for knowing why people reacted and responded to 1510 in the indicated manner. This novel audit feature allows the creator, owner, subject, or publishers of URL 1510, to investigate the responses one by one. In this manner they can assess the validity and quality of judgments about the URL in question by looking at subjective comments and tags entered 900, 905 about said URL, by looking at evidentiary links provided 910 relating to said URL, and even by looking at a particular respondent's rankings within the system 1300, 1301, to gain even more understanding about how the URL in question has been received by others.

Figure 14:
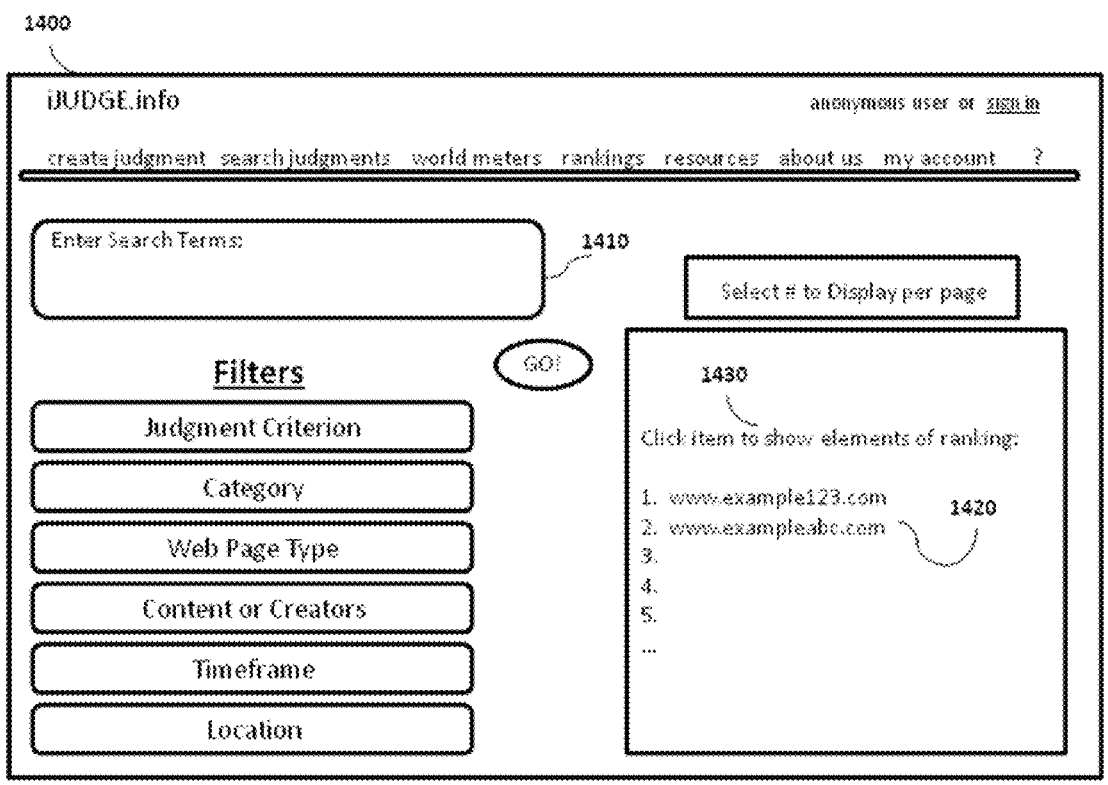
FIG. 14 is a sample Interface in Search mode.

FIG. 14 shows a sample of 115 in traditional keyword query directory search mode as opposed to the reverse lookup method employed in the metering and ranking modes. A user would type in keywords and extract results via matching cross-reference to 140 text-containing cells either populated programmatically from events 500, from existing membership data 505, or from event response data 515 and further cross reference by any filters selected to refine the query search. Those skilled in the arts realize that many possible search algorithms can be implemented in regards to 140 database keyword query searching rules and weightings. For example, some users of 105 may choose to apply heavier weightings to programmatically assigned creator and content text 500 and provide those matches to keyword search queries first, whereas alternate designs would place heavier emphasis on keyword search query matches to the respondent entered keywords found in 510.

As will be understood by those familiar with the art, the invention described herein may be embodied in other specific forms without departing from the spirit or essential characteristics thereof. Likewise, the particular naming and division of the articles, functions, procedures, programs, features, resources, methodologies and other aspects are not mandatory or significant, and the mechanisms that implement the invention or its features may have different names, divisions and/or formats. Furthermore, in embodiments of the present invention implemented as software, it can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A method to convert spontaneous, subjective responses of network respondents into statistical opinion data, comprising:

a computer communications network comprising at least one uniform resource identifier comprising at least one subject, and at least one respondent able to input at least one subjective response regarding at least one said subject; at least one computer controlled survey form delivered to said respondent requesting to respond to said subject, wherein said survey form comprises at least one fixed vocabulary question answered using an answer mechanism to select a response from one or more answer choices, and a save function permitting said respondent to save said response and other inputs into said survey form; said survey form further comprising: said fixed vocabulary question comprising a broadly phrased question relatable to any said subject, said answer choices each comprising one pair of antonyms, each said antonym naming a specific human value, belief, opinion, feeling, emotion, or judgment, and said answer mechanism is utilized to indicate a preference of one said antonym between said pair of antonyms creating said subjective response, wherein more than one said answer choice may be responded to by said respondent per said survey form;

converting said subjective response into mathematical response, comprising: said answer mechanism comprising a graphical slider comprising text and numeric displays, a slide track and a slide indicator, said slide indicator may be moved by said respondent between said pair of antonyms, wherein the antonyms of said pair of antonyms are displayed at opposing ends of said slide track with one said antonym assigned a mathematical value of negative 10.00 and its pairing antonym assigned a mathematical value of positive 10.00, wherein movement of said slide indicator by said respondent towards one said antonym selects that antonym as said subjective response to said fixed vocabulary question and no movement of said slide indicator displays default score of 0.00 and indicates no said subjective response, wherein said subjective response is mathematically scored comprising calibration of said slide indicator movement to display a score between negative 10.00 and positive 10.00 in increments of 0.01, said score is negative when direction of said movement is towards said antonym assigned said negative 10.00 and positive when said direction is towards said antonym assigned said positive 10.00, wherein said respondent utilizing said save function converts said subjective response into said mathematical response comprising said antonym selected in said subjective response mathematically scored with the said score last displayed prior to said utilizing;

creating survey response comprising the storage and identification of data from all said mathematical responses generated during the completion of said survey form by said respondent;

and at least one information processing system to deliver said survey form to said respondent, receive said survey response, assign identifiers to elements involved in said survey response, and enter said identifiers into a database for processing and delivery of outputs, said outputs comprising statistical opinion data regarding said subjects on said network, said statistical opinion data comprising mathematical rankings of said subjects by said antonyms.

2. The method of claim 1, wherein said subjective responses consist of at least one of affective, conative, and cognitive responses.

3. The method of claim 1, wherein said computer communications network is at least one of an intranet, extranet and the Internet.

4. The method of claim 1, wherein said uniform resource identifier is at least one of uniform resource location and uniform resource name.

5. The method of claim 1, wherein said subject comprises creators of said uniform resource identifiers.

6. The method of claim 1, wherein said subject is at least one of a website, webpage, textual content, non-textual content, product, service, interactive content, advertising content, markup language, meta title, and meta description tag.

7. The method of claim 1, wherein said respondent utilizes a text based or graphical user interface browser enabled computing device.

8. The method of claim 1, wherein said respondent requesting to respond to said subject comprises a command issued by said respondent into at least one of a web application, web form, graphical user interface widget, mobile application, and locally stored computer program.

9. The method of claim 1, wherein said respondent is an anonymous or member visitor of a website.

10. The method of claim 1, wherein said survey form further comprises said respondent ability to categorize said response, said respondent ability to typify said subject, and at least one field allowing permitting said respondent entry of subjective tag and comment data regarding said subject.

11. The method of claim 1, wherein said identifiers to elements comprise: time of said survey response event; said network analytic data related to said survey response; internet protocol address of said respondent; geographical information of said internet protocol address; uniform resource location of said subject; uniform resource name of said subject; said survey response antonyms and mathematical values associated with respective said mathematical responses; markup language data, including meta title and meta description tag, from said survey response associated uniform resource identifier; said respondent category, type, tag and comment data entered into said survey form; known demographic data of said respondent; and inferable demographic data of said respondent.

12. The method of claim, 1 wherein said outputs comprise: rankings of all said uniform resource indicators, said subjects, and said respondents involved in all said survey responses, by cumulative said mathematical positive values and cumulative said mathematical negative values stored in said information processing system, per each said antonym contained within all said answer choices within all said surveys; results from search term queries into a database containing all said identifiers to elements; and outputs from specific cross referencing commands to or requests from a database containing all said identifiers to elements.

13. The method of claim 1, further comprising: computer controlled integrity of said survey response utilizing a challenge response test which must be successfully passed by said respondent prior to creation of said survey response and a limitation of one said survey response per said respondent internet protocol address per said uniform resource identifier.

* * * * *